US008128899B2

(12) United States Patent
Rollinger et al.

(10) Patent No.: US 8,128,899 B2
(45) Date of Patent: Mar. 6, 2012

(54) PROCESS AND APPARATUS FOR UTILIZING OXYGEN-CONTAINING POLYMERS

(75) Inventors: Guy Rollinger, Wickrange (LU); Armin Kempf, Wendelsheim (DE)

(73) Assignee: Pac Holding, S.A., Wickrange (LU)

( * ) Notice: Subject to any disclaimer, the term of this patent is extended or adjusted under 35 U.S.C. 154(b) by 285 days.

(21) Appl. No.: 12/438,678

(22) PCT Filed: Aug. 29, 2007

(86) PCT No.: PCT/EP2007/007525
§ 371 (c)(1),
(2), (4) Date: Feb. 24, 2009

(87) PCT Pub. No.: WO2008/025521
PCT Pub. Date: Mar. 6, 2008

(65) Prior Publication Data
US 2009/0321680 A1 Dec. 31, 2009

(30) Foreign Application Priority Data
Aug. 30, 2006 (DE) .......................... 10 2006 040 662

(51) Int. Cl.
*C01B 3/02* (2006.01)
*C01D 7/00* (2006.01)

(52) U.S. Cl. ..................................... 423/421; 423/648.1
(58) Field of Classification Search .............. 423/648.1, 423/421
See application file for complete search history.

(56) References Cited

U.S. PATENT DOCUMENTS
3,252,773 A * 5/1966 Solomon et al. ................ 48/202
* cited by examiner

*Primary Examiner* — Wayne Langel
(74) *Attorney, Agent, or Firm* — James E. Walton; Richard G. Eldredge

(57) ABSTRACT

A process is described for converting and utilizing oxygen-containing polymers to form hydrogen and alkali metal carbonates, in which the polymers are brought into intimate contact with a melt mixture of alkali metal hydroxide and alkali metal carbonate to form hydrogen and alkali metal carbonate, and the alkali metal carbonate formed is removed from the reaction mixture during the reaction and alkali metal hydroxide is optionally metered in. The reaction is preferably carried out under conditions which lie on a point on the Liquidus line of the system. It is possible in accordance with the invention to process natural or synthetic polymers, for example polyester, polyether, wood, etc. It is particularly suitable for processing fiber-reinforced composite materials. Also described is an apparatus for performing the process according to the invention.

23 Claims, 2 Drawing Sheets

PROCESS AND APPARATUS FOR UTILIZING OXYGEN-CONTAINING POLYMERS

This invention relates to a process and apparatus for recovering value from oxygen-containing polymers by reaction of oxygen-containing polymers with alkali metal hydroxide to form hydrogen and alkali metal carbonates, wherein this reaction has for its purpose to dispose of and beneficiate the polymers as well as to recover important raw materials. The oxygen-containing polymers to be reacted may have been produced synthetically. They may also be natural-based polymers.

Polymers comprising carbon, hydrogen and oxygen atoms with and without other atoms occur in nature and also occur as synthetic products in various forms.

A multiplicity of consumer durables are substantially of plastics which consist of such polymers, are made of such polymers or comprise such polymers to a considerable extent at least. Textiles are made of synthetic, natural or regenerated fibers, i.e., from such polymers. Polymers of this kind are also to be found in renewable raw materials.

A very frequent problem is that of disposing of these polymers or that of beneficiating these polymers in order that the starting materials from which these polymers were formed may be recovered.

The simplest form of disposal is to incinerate these polymers or to landfill them. Incineration, it is true, does present a way of using the energy recovered in the process, but the waste gases represent an adverse impact on the environment and therefore have to be rendered harmless, which in some instances is inconvenient and costly. And it is still not entirely avoidable that some of the gases, in particular the climate-damaging $CO_2$, pass into the atmosphere.

Processes involving the scissioning of the polymers into their individual constituents lead to the corresponding raw materials, but these usually do not have virgin quality, i.e., when used again to make the corresponding polymers the products obtained are of inferior quality. In addition, the beneficiation process needed, involving glycolysis or hydrolysis for example, is very inconvenient and costly in process engineering terms.

There are also processes in existence where hydrocarbonaceous and/or halogenated waste products particularly including plastics such as polyethylene, polypropylene, etc. are disposed of by reaction in a hydroxide melt. This process, described in EP 0 991 734 B1, is said to operate at a temperature ranging from 580° to 900° C. The primary products are gaseous materials such as hydrogen and methane.

The reaction described therein can also give rise to metal hydrides, which complicates the handling of the process. Moreover, the hydrogen quantity at lower temperatures is below the attainable maximum.

U.S. Pat. No. 6,607,707 B2 describes a process wherein hydrogen gas is generated by reacting hydrocarbons or oxidized hydrocarbonaceous compounds with an alkali metal hydroxide. Low molecular weight substances are reacted according to the process described therein. It is clear from the description that only monomeric substances such as methanol, ethanol, formaldehyde and the like are used. As for the rest, the process is preferably carried out in the presence of water and catalysts.

Promptings to use polymers in the manner of the present invention are not discernible from this reference. Nor does a person having ordinary skill in the art find any suggestions in this reference of an industrial process on a continuous scale in particular.

U.S. Pat. No. 3,252,773 describes the gasification of carbonaceous materials by the action of steam and oxygen. Alkali metal hydroxides can also be present during the reaction.

U.S. Patent Application US 2005/0163704 A1 describes the reaction of various carbon-, hydrogen- and oxygen-containing compounds including carbohydrates. This reaction focuses on the production of hydrogen gas, but it also uses water. A process as disclosed in the present invention is not discernible from this reference.

Although processes for producing hydrogen-containing gases from polymers comprising carbon, hydrogen and oxygen atoms are already in existence, there is still a need for an improved process which provides an economical operation, which is capable of processing a broad spectrum of polymers and which can be carried out continuously in particular and which provides low-residue, environmentally friendly and energy-efficient operation.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

Figure 1:
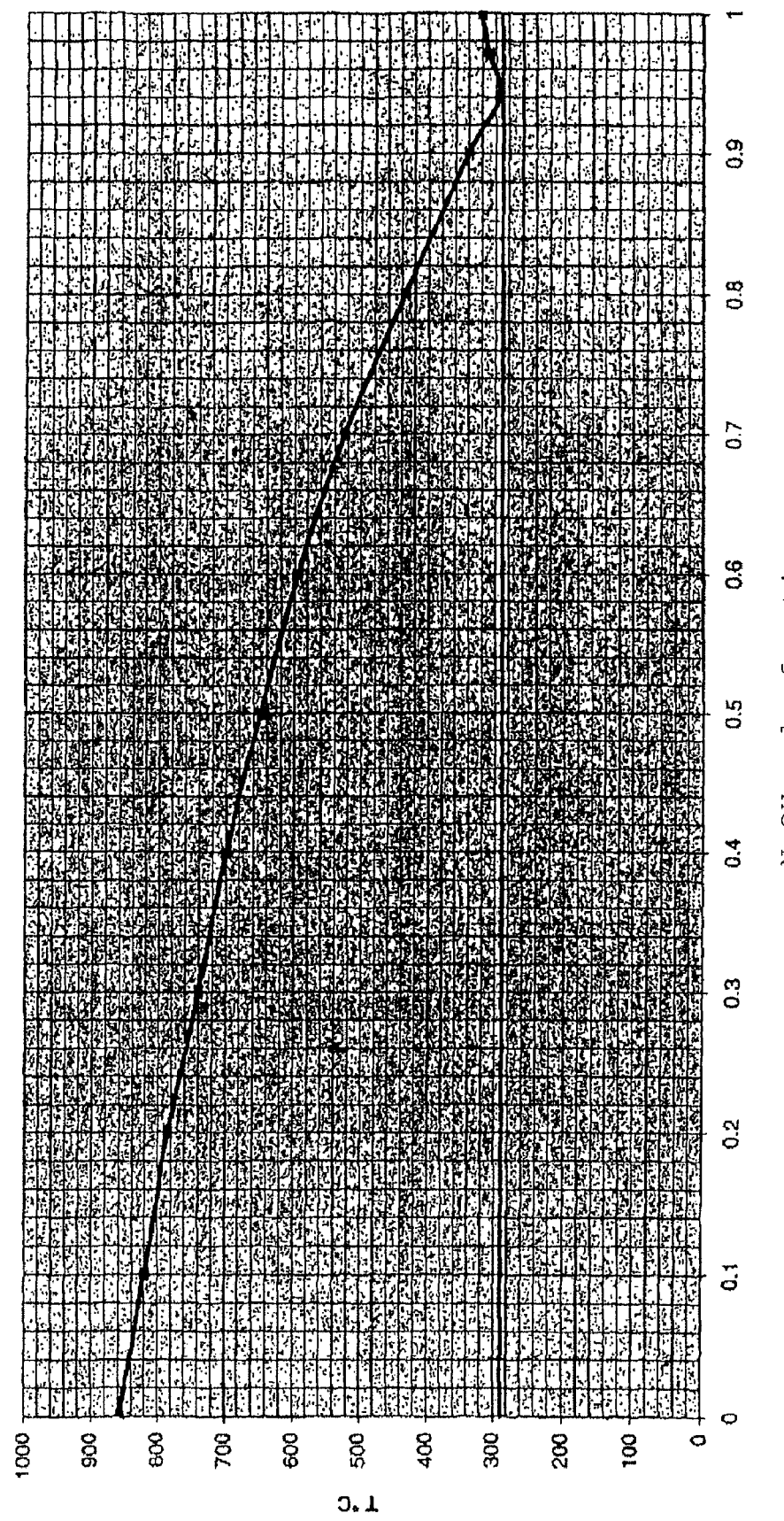
FIG. 1 shows a phase diagram of sodium carbonate and sodium hydroxide as an example of an alkali metal carbonate and alkali metal hydroxide system.

The present invention has for its object to provide a process for producing hydrogen and alkali metal carbonates by reaction of polymers comprising carbon, hydrogen and oxygen atoms with and without further atoms with alkali metal hydroxides which provides environmentally friendly and energy-saving operation, which provides an ideally quantitative conversion of the polymer into hydrogen and alkali metal carbonate and which gives rise to a gas which consists essentially of hydrogen only and can be used directly in manifold ways, for example in chemical reactions or for energy recovery, and which recovers an alkali metal carbonate which can be used as an industrial raw material or else re-used within the process, for example by reaction with $Ca(OH)_2$ to form the original alkali metal hydroxide.

The present invention further has for its object to provide a process which does not itself generate any environmentally damaging gases and which binds the carbon which is in the polymer and which normally passes into the atmosphere as $CO_2$ with most existing processes, and thus also contributes to reducing the $CO_2$ content of the atmosphere, and which uses less energy than it generates and which thus can also be used for heat recovery.

The present invention further has for its object to provide a process which is flexible with regard to reaction conditions and which makes it possible for temperature conditions to be conformed to the polymer to be used.

The present invention further has for its object to provide a process which is flexible with regard to reaction conditions particularly with regard to reaction temperature, so that the reaction with a polymer can be carried out at different rates and thus can be conformed to continuous disposal processes for example. This is particularly important in relation to continuous operation when material supplied in varying amounts is to be processed as soon as possible.

The present invention further has for its object to provide an apparatus with which the process described hereinbelow can be carried out.

We have found that this object is achieved by a process for reacting oxygen-containing polymers to form hydrogen and alkali metal carbonates, characterized in that polymers comprising carbon, hydrogen and oxygen atoms with and without further atoms are brought into intimate contact with a molten mixture of alkali metal hydroxide and alkali metal carbonate, the reaction is carried out while avoiding direct contact of the interior of the employed reactor above the molten mixture with the oxygen of the atmosphere, the resulting hydrogen is separated off and the resulting alkali metal carbonate is crystallized out and separated off, and the alkali metal hydroxide quantity made available, and maintained as a concentration, in the reaction mixture during the reaction is at least sufficient to start and maintain the reaction with the polymers.

The alkali metal hydroxide quantity required can be provided by initially charging, for the reaction, an amount of molten mixture which comprises at least an amount of alkali metal hydroxide sufficient to react the total amount of polymer. It is advantageous to use an excess, i.e., more than required for stoichiometric reaction, for example an excess of at least 10 mol % of alkali metal hydroxide. But it is preferable to use a multiple, for example 2, 3, 4 or even 10 times or more of the required amount.

A further possibility consists in adding further sodium hydroxide during the reaction.

Preferably, the reaction is carried out in a melt at a constant temperature and at a constant composition, the temperature and the composition being on one point of the liquidus line of the temperature-composition diagram.

Advantageously, this temperature is varied from 1 to 10° C. along the liquidus line.

Preferably, the polymers are used in comminuted form.

Advantageously, the process is carried out in a system which is sealed off from ambient air.

Preferably, a molten mixture in the form of a saturated solution of alkali metal carbonate in alkali metal hydroxide is used.

Preferably, sodium hydroxide is used as alkali metal hydroxide and sodium carbonate as alkali metal carbonate.

In a further advantageous embodiment, a molten mixture of eutectic composition is used.

It is also possible to use a melt composition in the vicinity of the eutecticum.

Preferably, one or other component is present in the melt at a concentration which is up to 0.5 mol % higher than that corresponding to the eutecticum.

In a further advantageous embodiment, a molten mixture is used in which the fraction of sodium carbonate in the molten mixture is in the range from 6 to 40, preferably 6 to 20 and particularly 6 to 10 mol %.

Advantageously, a temperature gradient is established in the reaction vessel.

In a further advantageous embodiment of the process of the present invention, the polymers are temporarily added into a melt composition which is above the liquidus line and the addition of further alkali metal hydroxide does not resume until the melt composition has reached the liquidus line by virtue of the carbonate formed.

It is also possible for, during the reaction, the composition of the molten mixture to be shifted into the region above the liquidus line by increased addition of alkali metal hydroxide and then the addition of alkali metal hydroxide is interrupted until the liquidus line is reached again.

The process of the present invention is advantageously useful for the reaction of polymers and polymer mixtures from the group consisting of polyesters, polycarbonates, polyethers, polyacetals, epoxy resins, polylactones, polylactides, polyglycolides, polyacrylates, polyvinyl acetate, biopolymers, wood, cellulose, lignin, cutin and pectin.

A further embodiment of the process of the present invention utilizes polymers comprising still other constituents such as reinforcing fibers, fillers, customary additives or polymers present as composites.

In a further embodiment of the process of the present invention, the oxygen which is required for complete oxidation of the carbon atoms is introduced to the melt in free or bound form underneath the surface of the melt, in particular in the use of polymers where the ratio of oxygen atoms to carbon atoms is less than 1. In bound form, the oxygen can also be added above the melt separately or together with the starting materials.

The oxygen in bound form can advantageously be introduced as formic acid, oxalic acid, carbon dioxide or water for example.

The process is preferably carried out continuously.

The present invention further provides an apparatus for carrying out the process described above which is characterized by a reactor (1) for receiving the reactants and for carrying out the reaction and also an apparatus (2) for mingling the molten mixture with the polymers, the alkali metal hydroxide which is further added and any further additives, a stock reservoir vessel (5) for receiving alkali metal hydroxide and also a feed line (4) to the reactor, a stock reservoir vessel (7) for receiving the polymers and a feed line (6) to the reactor, an exit line (8) for removing the resulting hydrogen, an apparatus (9) for transporting the alkali metal carbonate which is crystallized out through an exit line (10) to a stock reservoir vessel (11) for receiving the resulting alkali metal carbonate, and an apparatus (12) for feeding inert gas into the stock reservoir vessels (5) and (7), the feed lines (4) and (6) and the reactor space (3) above the molten mixture.

Appropriate conveying devices such as screws, impeller wheels or pushers can be installed between the stock reservoir vessels 5 and 7 and the lines 4 and 6. The apparatus includes a feed line 13 to introduce oxygen in bound or free form underneath the surface of the molten mixture, if appropriate.

Further feed lines (14*a-e*) can be provided for introducing inert gas into feed lines and reaction space.

The process of the present invention can be carried out in a reaction vessel (reactor) which is stable under the reaction conditions to the reaction mixture; especially special grade steels such as Inconel are useful as material here.

The reactor can be heated or else cooled, for example using a jacketing system through which an appropriate heating or cooling medium is passed. However, it is also possible to control the temperature in some other way, for example by electric heating or by a heat recovery system with which the exothermic heat of reaction is removed as useful energy.

It is particularly advantageous for the heating and cooling system to be engineered such that, in the reactor, a temperature gradient is produced in the reaction mixture either steplessly or else sectionwise.

The starting materials required for the reaction, namely the polymers, alkali metal hydroxide and also, as far as necessary, the alkali metal carbonate, optional admixtures or else recycled melt fractions, can be added to the reactor separately, but also conjointly in an appropriate mixing ratio. This can be accomplished from corresponding stock reservoir vessels, in which case care must be taken to ensure that at the start of the reaction in the reaction space no oxygen ensues into the space above the surface of the reaction mixture. This can be accomplished for example by purging the reactor space at the start of the reaction oxygen-free by introduction of inert gas and also purging the stock reservoir vessels and the feed lines with inert gas. The stock reservoir vessels are then advantageously sealed off against the atmosphere, or any inflowing air is further displaced with inert gas.

It is important for the reaction that the polymer come into intimate contact with the molten mixture. It is advantageous when the area of contact offered by the polymer is as large as possible, which can be accomplished through appropriate comminution of the article composed of polymer.

It is advantageous to provide sufficient stirring during the reaction. However, it is also possible to ensure intimate contact by circulating the melt for example. Static mixers can also be used to ensure good mixing.

The polymers can be added in a wide variety of forms, for example as granulate, pellets, as comminuted material, such as chaff for example; addition in the form of a powder is also possible.

It is also possible to introduce the polymer into the melt in containers, in which case the containers have openings for the melt to pass into the interior of the container, for example in closed wire baskets. This makes it possible for constituents such as for example metals or other material which does not take part in the reaction to be held in the container, so that it does not pass together with the melt into the settling alkali metal carbonate. This is also advantageous in the case of polymers having a higher density than the melt, in order that these polymers do not sink too rapidly but are held in the upper reaction zone until fully reacted.

Keeping the stock reservoir vessels and the space in the reactor above the surface of the melt free of oxygen is advisable to avoid the formation of detonating gas and to recover a very pure hydrogen as product.

If, to ensure complete conversion of the carbon in the polymers into carbon dioxide and thus into sodium carbonate, the polymer itself does not contain sufficient oxygen atoms, it can be necessary, in particular in the case of polymers in which the ratio of oxygen to carbon is less than 1, to introduce oxygen into the system. This can be accomplished in the form of free oxygen or else in the form of oxygen in bound form, i.e., by metered addition of compounds which supply the corresponding oxygen for the oxidation.

Free oxygen is added underneath the surface of the melt and bound oxygen is added underneath or above the surface of the melt.

The reactor is further provided with corresponding feed lines (4), (6) through which the polymer and the individual further components of the reaction system can be added. Further feed lines (14a-e) for introducing inert gas are advantageous.

The reactor is further provided with sensors for all operating parameters, in particular the temperature, and contains feed lines for feeding components underneath the surface of the melt.

There is also a discharge for removing the hydrogen formed and also exit lines for removing the sodium carbonate which has formed during the reaction and separates off.

When the density of the melt is less than of the sodium carbonate formed, the sodium carbonate is incrementally or continuously discharged at the lower part of the reactor. When the density in the melt is higher than the density of the sodium carbonate formed, the sodium carbonate will accumulate at the surface of the melt and is removed from the system through appropriate outlets.

FIG. 1 shows a phase diagram of sodium carbonate and sodium hydroxide as an example of an alkali metal carbonate and alkali metal hydroxide system. A saturated solution is present when the process is operated directly on the liquidus line. As sodium carbonate is formed at the liquidus line, the system becomes leaner in sodium hydroxide, i.e., the amount of the saturated solution decreases at constant composition and can be put back into the original state by adding further sodium hydroxide.

By raising the sodium hydroxide content of the system at constant temperature to a point above the liquidus line, the system can end up in the region of the unsaturated solutions. However, as the reaction proceeds and the amount of $Na_2CO_3$ in the melt increases, the system moves from right to left and comes back to the liquidus line, from which point $Na_2CO_3$ can crystallize out and where it is then necessary to again add further sodium hydroxide.

Systems of other alkali metal carbonates and alkali metal hydroxides are subject to similar conditions to those shown for the sodium hydroxide and sodium carbonate system.

It will be appreciated that by using for example mixtures of alkali metal hydroxides, alkali metal carbonates or else auxiliary materials such as salts or oxides it is possible to create in an analogous manner similar conditions for the corresponding liquidus lines or liquidus areas in the case of ternary or higher n-ary systems.

When processing glass fiber reinforced composites for example, the phase diagram likewise changes, i.e., shifts, in the course of the reaction. The corresponding conditions, i.e., the presence of a corresponding liquidus line and suitable points where an alkali metal carbonate separation takes place, can be determined in a few preliminary experiments which are within the workmanlike skill of a person having ordinary skill in the art.

It is possible that, for example, when fiber-reinforced polymers are processed, the introduction of aluminum oxide, silicon oxide and boron oxide also changes the density conditions, so that the melt has a higher density than the alkali metal carbonate formed. In such a case, it will be appreciated that the alkali metal carbonate separates at the surface of the melt.

As is discernible from the sodium hydroxide/sodium carbonate phase diagram, the process of the present invention makes it possible for example to operate at various temperatures and various melt compositions, in accordance with the liquidus line. This provides a way of increasing the sodium carbonate content in the melt to achieve higher temperature ranges and thereby to increase the reaction rate of a particular polymer during the reaction.

This also provides a way whereby any one specific plastic which is difficult to process at a comparatively low temperature can be processed at higher temperatures.

Figure 2:
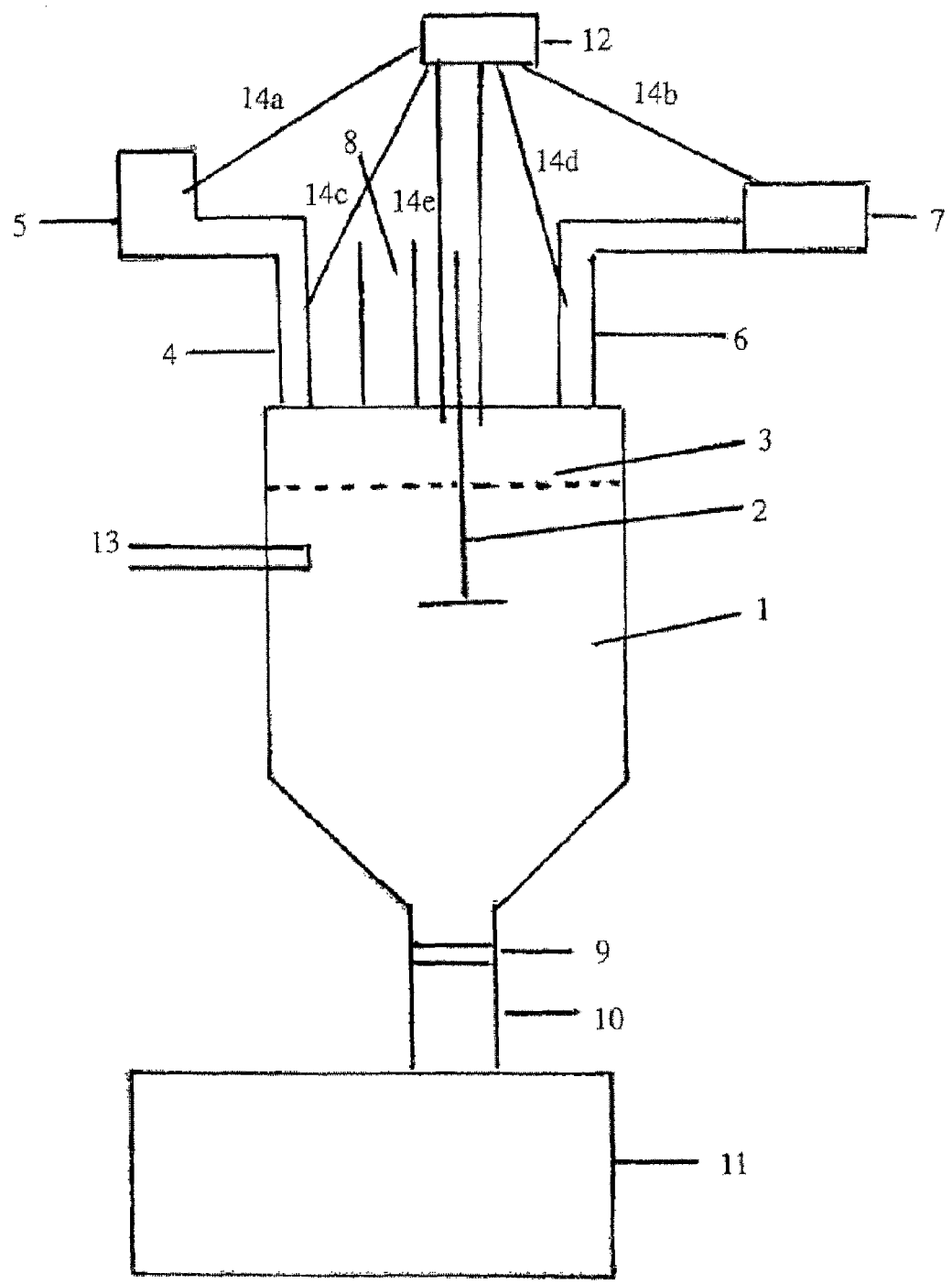
FIG. 2 shows the process of the present invention carried out using an apparatus as depicted in FIG. 2.

The process of the present invention can be carried out using an apparatus as depicted in FIG. 2.

The examples which follow illustrate the invention:

Example 1

A heatable stirred reactor made of special grade steel is charged with solid sodium carbonate ($Na_2CO_3$) and solid sodium hydroxide (NaOH) in a molar ratio of 1:8, and this initial charge is heated with mixing until a homogeneous melt has formed.

The melt is then adjusted to a temperature of 352° C., which corresponds to the experimentally ascertained liquidus temperature for this mixing ratio, and maintained very close to this temperature, i.e., at most only slightly above this temperature.

From a stock reservoir chamber, solid polyethylene terephthalate chaff particles from waste bottles are added a little at a time into the upper part of the reactor and to the melt with rapid stirring. This ensures good contacting of the particles with the melt.

The air in the stock reservoir vessels used is previously dispelled by means of inert gas in order thereby to ensure substantial exclusion of oxygen. The space in the reactor above the melt is also kept substantially oxygen-free by means of an inert gas atmosphere.

The addition of inert gas is then discontinued after onset of the actual reaction and of the release of hydrogen.

The hydrogen released during the reaction is passed through a separate pipe. Sodium hydroxide is consumed by the formation of sodium carbonate until the reaction has ceased. Since the melt is saturated with $Na_2CO_3$, the sodium carbonate formed during the reaction precipitates as a crystalline deposit at the lower part of the reactor, where there is no stirring. The melt composition remains constant while the melt quantity decreases. After the reaction has ended, the sodium carbonate crystals formed and the remaining sodium hydroxide/sodium carbonate melt thereabove are separated from each other.

Example 2

In a stirred reactor as used in Example 1, solid sodium carbonate and solid sodium hydroxide are mixed in a molar ratio of 1:4 and heated until a homogeneous melt has formed.

The mixture is adjusted to a temperature of 432° C., which corresponds to the experimentally ascertained liquidus point of this composition. During the reaction, the melt is maintained as close as possible above this temperature.

From a stock reservoir chamber under inert gas a mixture of solid polyethylene terephthalate chaff from waste bottles and solid granular NaOH in a weight ratio of 1:4 is added a little at a time to the melt with rapid stirring.

During the start of the reaction, an inert gas atmosphere is maintained above the melt, but the inert gas feed is discontinued once the reaction is in progress. The constant addition of further solid granular NaOH together with the solid PET chaff ensures that the melt composition and the melt volume remain constant while the volume of $Na_2CO_3$ increases.

The sodium carbonate formed during the reaction is discharged at intervals, the rate of discharge of sodium carbonate and the rate of addition of PET chaff and NaOH being coordinated with each other such that the fill level in the reactor remains virtually constant.

Comparing the reaction rates of Examples 1 and 2 shows that the reaction rate of Example 2 is about seven times that of Example 1.

Example 3

A reactor as used in Examples 1 and 2 is supplied with polyethylene terephthalate chaff and sodium hydroxide as starting materials from separate stock reservoir chambers. The two streams of material are each preheated separately. The NaOH is preheated to above its melting point, so that it can be added in liquid form.

In one version, the starting materials are introduced into the reactor above the surface of the reaction mixture, so that they free-fall into the reaction mixture.

In another version, the two streams are introduced underneath the surface of the molten mixture, directly into the melt. The crystallizing and settling out of the sodium carbonate formed is speeded by applying a temperature gradient in the reactor. The lower part of the melt is maintained at a temperature of 320° C., the upper part at 500° C.

The sodium carbonate formed is discharged with the aid of a screw.

Example 4

Pulverulent sodium carbonate and small-grained sodium hydroxide are mixed with each other in a molar ratio of 6:94 corresponding to the eutectic composition and hence to the lowest melting point of the system. The mixture has added to it a finely ground waste material which comes from the composite materials of the building trade and consists, to an extent of 95% by weight, of glass fiber reinforced polymers having a polymer fraction of about 75% by weight.

The remaining fractions are predominantly wood and colorant.

The materials are thoroughly commixed and are gradually heated in a heatable reactor to a final temperature of 580° C. at a heating rate of about 100° C. per hour. As soon as a melt forms in the reactor (temperature measured 285° C.), the reaction commences with gas evolution.

The gas formed is led off through a discharge pipe; it consists of hydrogen.

During the start-up phase, the reactor is put under inert gas atmosphere.

As the reaction progresses, the dissolved glass fiber constituents such as for example $Al_2O_3$, $SiO_2$, MgO and $B_2O_3$ mean that a complex multicomponent system of varying composition is formed. As a result, melting points, liquidus lines and other physical properties are shifted compared with the melting point and the other physical properties of the binary $Na_2CO_3$-NaOH system.

In this reaction, sodium carbonate formed settles out on the surface of the melt, since the melt reaches a higher density than that of sodium carbonate owing to the inorganic constituents of the composite material which are of higher specific gravity. The sodium carbonate which accumulates above the melt is discharged at intervals.

The present invention further provides the teachings which are disclosed in the claims.

What is claimed is:

1. A method for reacting oxygen-containing polymers to form hydrogen and alkali metal carbonates, comprising:
bringing polymers comprising carbon, hydrogen and oxygen atoms with and without further atoms into intimate contact with a molten mixture of alkali metal hydroxide and alkali metal carbonate;
carrying out the reaction while avoiding direct contact of the interior of the employed reactor above the molten mixture with the oxygen of the atmosphere; and
separating off the resulting hydrogen and crystallizing out and separating off the resulting alkali metal carbonate;
wherein at least a quantity of alkali metal hydroxide is made available, and a concentration of alkali metal hydroxide is maintained in the reaction mixture during the reaction, which are sufficient to start and maintain an exothermic reaction of alkali metal hydroxide together with the oxygen-containing polymers.

2. The method according to claim 1 wherein an excess of melt is initially charged to ensure an excess of alkali metal hydroxide based on the polymer.

3. The method according to claim 1 wherein further alkali metal hydroxide is added.

4. The method according to claim 1 wherein the reaction is carried out in a melt at a constant temperature and at a constant composition, the temperature and the composition being on one point of the liquidus line of the temperature-composition diagram.

5. The method according to claim 4 wherein the reaction temperature is varied from 1 to 10° C. along the liquidus line.

6. The method according to claim 1, wherein the polymers are used in crushed form.

7. The method according to claim 1, wherein the method is carried out in a system which is sealed off from ambient air.

8. The method according to claim 1, wherein a molten mixture in the form of a saturated solution of alkali metal carbonate in alkali metal hydroxide is used.

9. The method according to claim 1, wherein sodium hydroxide is used as alkali metal hydroxide and sodium carbonate as alkali metal carbonate.

10. The method according to claim 1, wherein a molten mixture of eutectic composition is used.

11. The method according to claim 1, wherein a melt composition in the vicinity of the eutecticum is used.

12. The method according to claim 11 wherein one or other component is present in the melt at a concentration which is up to 0.5 mol % higher than that corresponding to the eutecticum.

13. The method according to claim 9 wherein a molten mixture is used in which the fraction of sodium carbonate in the molten mixture is in the range from 6 to 40 mol %.

14. The method according to claim 1, wherein a temperature gradient is established in the reaction vessel.

15. The method according to claim 1 wherein the polymers are temporarily added into a melt composition which is above the liquidus line and the addition of further alkali metal hydroxide is only resumed once the melt has reached the liquidus line by virtue of the carbonate formed.

16. The method according to claim 1, wherein during the reaction, the composition of the molten mixture is shifted into and/or temporarily maintained in the region above the liquidus line by increased addition of alkali metal hydroxide and the addition of alkali metal hydroxide is interrupted until the solidous/liquidus line is reached again.

17. The method according to claim 1, wherein polymers or polymer mixtures from the group consisting of polyesters, polycarbonates, polyethers, polyacetals, epoxy resins, polylactones, polylactides, polyglycolides, polyacrylates, polyvinyl acetate, biopolymers, wood, cellulose, lignin, cutin and pectin are used for the reaction.

18. The method according to claim 1, wherein the polymers used comprise still other constituents being reinforcing fibers, fillers, customary additives, or are present as composite materials.

19. The method according to claim 1, wherein oxygen is added to the melt in free or bound form, in particular in the case of polymers where the ratio of oxygen atoms to carbon atoms is less than 1 and which require oxygen for complete oxidation of the carbon atoms, the oxygen in free form being introduced underneath the surface of the melt and the oxygen in bound form being introduced above or underneath the surface of the melt.

20. The method according to claim 19 wherein the oxygen in bound form is introduced in the form of formic acid, oxalic acid, water or carbon dioxide.

21. The method according to claim 1, wherein the method is carried out continuously.

22. The method according to claim 9 wherein a molten mixture is used in which the fraction of sodium carbonate in the molten mixture is in the range from 6 to 20 mol %.

23. The method according to claim 9 wherein a molten mixture is used in which the fraction of sodium carbonate in the molten mixture is in the range from 6 to 10 mol %.

* * * * *

UNITED STATES PATENT AND TRADEMARK OFFICE
CERTIFICATE OF CORRECTION

PATENT NO. : 8,128,899 B2  
APPLICATION NO. : 12/438678  
DATED : March 6, 2012  
INVENTOR(S) : Guy Rollinger et al.

Page 1 of 1

It is certified that error appears in the above-identified patent and that said Letters Patent is hereby corrected as shown below:

Column 3, line 15, that portion of the sentence reading "maintained as a concentration" should be changed to --maintained at a concentration--.
Column 10, line 4, that portion of the claim reading "solidous/liquidus" should be changed to --solidus/liguidus--.

Signed and Sealed this
Twenty-eighth Day of August, 2012

David J. Kappos
*Director of the United States Patent and Trademark Office*